(12) United States Patent
Takeuchi et al.

(10) Patent No.: US 8,638,823 B2
(45) Date of Patent: Jan. 28, 2014

(54) SENDING APPARATUS, RECEIVING APPARATUS, AND TRANSMISSION SYSTEM

(75) Inventors: Hiroshi Takeuchi, Tokyo (JP); Koji Takatori, Tokyo (JP); Yasuyuki Fukashiro, Yokohama (JP); Kohei Mandai, Tokyo (JP); Hidemasa Narita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 13/021,600

(22) Filed: Feb. 4, 2011

(65) Prior Publication Data

US 2011/0216783 A1    Sep. 8, 2011

(30) Foreign Application Priority Data

Mar. 5, 2010    (JP) .................................. 2010-048770

(51) Int. Cl.
*H04J 3/06*    (2006.01)
(52) U.S. Cl.
USPC .......................................................... 370/509
(58) Field of Classification Search
USPC ................................................. 370/503–514
See application file for complete search history.

(56) References Cited

U.S. PATENT DOCUMENTS

2009/0263130 A1* 10/2009 Luo et al. .................... 398/58
2010/0316379 A1* 12/2010 Suvakovic .................... 398/58

FOREIGN PATENT DOCUMENTS

| JP | 01-311739 | 12/1989 |
| JP | 09-018466 | 1/1997 |
| JP | 2002-344437 | 11/2002 |

OTHER PUBLICATIONS

Japan Patent Office Notification of Reasons for Refusal on application 2010-048770 mailed Jun. 25, 2013; pp. 1-2.

* cited by examiner

*Primary Examiner* — Kwang B Yao
*Assistant Examiner* — Juvena Loo
(74) *Attorney, Agent, or Firm* — Foley & Lardner LLP

(57) ABSTRACT

A transmission system is provided in a synchronous network, for establishing synchronization with a degree of precision and at a speed being comparable levels as a conventional technique, and further decreasing the probability of out-of-synchronization occurrence. In the present invention, a synchronization signal is detected without performing error correction until synchronization is established, and after the synchronization is established, it is monitored whether or not out-of-synchronization occurs, according to the synchronization signal that has been subjected to the error correction.

8 Claims, 6 Drawing Sheets

FIG. 1
TRANSMISSION SYSTEM 10

FIG. 2
SENDING APPARATUS 20

FIG. 3

FAS : Frame Alignment Signal
MFAS : Multi Frame Alignment Signal
SM : Section Monitoring
GCC : General Communication Channel
RES : Reserved for future international standardation
PM : Path Monitoring
TCM : Tandem Connection Monitoring ACT : Actiivation/deactivation control channel
FTFL : Fault Type & Fault Location reporting channel
EXP : Experimental
APS : Automatic Protection Switching
PCC : Protection Communication Channel
OPU : Optical-channel Payload Unit

FIG. 4

RECEIVING APPARATUS 30

FAS

SENDING APPARATUS, RECEIVING APPARATUS, AND TRANSMISSION SYSTEM

BACKGROUND OF THE INVENTION

1. Field of the Invention

The present invention relates to a technique for establishing synchronization between devices via a network and monitoring whether or not the synchronization being established is maintained. The present application claims priority from Japanese Patent Application No. 2010-48770, filed Mar. 5, 2010, and the disclosures described in this application are incorporated herein by reference in the designation states that accept such incorporation by reference.

2. Description of the Related Art

According to development of optical transmission technique in recent years, a signal speed increases from day to day, and communications at the signal speed of 40 Gbit/s (gigabit per second), 100 Gbit/s, or the like, are proceeding toward practical utilization these days. With the increase of the signal speed, transmittable and receivable data volume is increased. However, when the signal speed becomes 40 Gbit/s or higher, influences such as chromatic dispersion and self-phase modulation become conspicuous, resulting in an increase of signal errors. In view of such problems, an error rate is tried to be improved according to an error correction technique, referred to as RS-FEC (Reed-Solomon Forward Error Correction) or E-FEC (Enhanced Forward Error Correction).

In the meantime, a frame contains a synchronization pattern that is used for establishing synchronization, and it is defined as a standard that this synchronization pattern is not subjected to the error correction. Therefore, after the synchronization is established, even when signals are deteriorated to a degree that the FEC is able to restore proper data, as for the data targeted for transmission, it is not possible to correct the error in the synchronization pattern, and accordingly, it may be wrongly determined as out of synchronization.

Furthermore, it is necessary to prevent unstable synchronization, such as erroneously recognizing a noise as a synchronization pattern, leading to synchronization with the noise, or even after the synchronization is established, instantaneous noise may cause a situation regarded as out of synchronization. Therefore, in general, a following method is employed: when a synchronization pattern is successively detected in serial frames, the number of which is equal to or more than a predetermined number, a transition to synchronous state takes place in the device; and when the synchronization pattern successively fails to be detected in serial frames, the number of which is equal to or more than the predetermined number, a transition to out-of-synchronization (HUNT) state takes place in the device.

The number of times the synchronization pattern is detected successively in order to shift the device from out-of-synchronization state to the synchronous state is referred to as the number of in-frame (s), and the number of times successively failing to detect the synchronization pattern in order to shift the device from the synchronous state to the out-of-synchronization state is referred to as the number of out-frame (s).

In the method as described above, when it is assumed that the number of out-frames is $M_2$, the frame synchronization pattern length is x, the probability of mismatch of frame synchronization pattern is r, the transmission speed is S, the frame length is L, and the error rate of the transmission path is $\varepsilon$, the misframe time $T_m$, from establishing synchronization until returning to the HUNT state as a result of failing to successively detect the synchronization pattern, is calculated according to the following formulas (1) and (2), for instance.

$$r = 1 - (1 - \varepsilon)^x \qquad (1)$$

$$T_m = \frac{1 - r^{M_2}}{(1-r) \times r^{M_2}} \times \frac{L}{S} \qquad (2)$$

According to the above formulas, when it is assumed that the synchronous pattern length x is 32 bits, the number of out-frames $M_2$ is 2, and the error rate of transmission path $\varepsilon$ is $10^{-4}$, the misframe time $T_m$ is approximately 11.9 years in the case of STM-1 (Synchronous Transfer Mode-1). In the case of STM-64 (Synchronous Transfer Mode-64), the frame time is identical to that of STM-1 and the probability of becoming out-of-synchronization is approximately 11.9 years that is equal to the case of STM-1, even though the signal speed increases.

On the other hand, in the case of 40 G (OTU3:Optical Channel Transport Unit 3) in an OTN (Optical Transport Network), it is calculated that the out-of-synchronization occurs after a lapse of approximately 106 days. Furthermore, in the case of 100 G (OTU4:Optical Channel Transport Unit 4), since the bit number within one frame is equal to the bit number in the case of 40 G (OTU3), the frame time becomes different and it is calculated that the out-of-synchronization occurs after a lapse of approximately 41 days only. In general, it is desirable that the misframe time $T_m$ is longer than the life of equipment.

Japanese Unexamined Patent Application Publication No. 9-18466 (hereinafter, referred to as "patent document 1") discloses a method which subjects a synchronization pattern to error correction, and even when some errors occur in the synchronization pattern, it is possible to maintain synchronization.

SUMMARY OF THE INVENTION

Here, the method as described in the patent document 1 is based on the premise that a convolutional code is used as the error correction method and Viterbi decoding is executed for extracting the synchronization pattern. However, if the Viterbi decoding is executed in the state that the frame synchronization has not been established yet, it is not possible to decode data at a proper frame bit position, thereby disabling extraction of the synchronization pattern.

On this occasion, it is conceivable that the Viterbi decoding is executed at all the bit positions until a proper synchronization pattern is obtained. However, this may increase a processing load, taking a long time until the synchronization pattern is found, and consequently, efficiency may be worsened.

The present invention has been made in view of the problems above, and an object of the present invention is to establish synchronization with a degree of precision and at a speed, being comparable levels as a conventional technique, and further decrease the probability of out-of-synchronization occurrence.

In order to solve the problems above, in the present invention, a synchronization signal is detected without performing error correction until synchronization is established, and after the synchronization is established, it is monitored whether or not out-of-synchronization exists according to the synchronization signal that has been subjected to the error correction.

By way of example, a first aspect of the present invention is directed to a sending apparatus for sending a signal via a network, the sending apparatus being provided with a header generator which generates header information including a first synchronization signal, a second synchronization signal, and information relating to user data as a transmission target, being inputted from an external device, an FEC (Forward Error Correction) generator which generates FEC data for correcting an error in a portion other than the first synchronization signal in the header information generated by the header generator and in the user data, a frame generator which uses the user data as a payload to generate a transmission frame including the header information, the payload, and the FEC data, and a sending unit for sending via the network, the transmission frame generated by the frame generator.

A second aspect of the present invention is directed to a receiving apparatus for receiving a transmission frame that is sent via the network, the transmission frame including header information, a payload, and FEC (Forward Error Correction) data, the header information including a first synchronization signal and a second synchronization signal, and the FEC data being data for correcting an error in a portion other than the first synchronization signal in the header information and in the payload, the receiving apparatus being provided with, a synchronization establishing unit for establishing frame synchronization by detecting the first synchronization signal within the header information of the transmission frame, an FEC execution unit for executing error correction in the head information and in the payload, by using the FEC data within the transmission frame, after the synchronization establishing unit has established the frame synchronization, an out-of-synchronization monitor for making a judgment whether or not the frame synchronization is maintained, by determining whether or not the second synchronization signal included in the header information having been subjected to the error correction by the FEC execution unit matches a signal pattern being predetermined, and a data output unit for extracting the payload within the transmission frame when the out-of-synchronization monitor determines that the frame synchronization is maintained, and outputting the payload to an external device.

According to the present invention, it is possible to establish synchronization with a degree of precision and at a speed, being comparable levels as a conventional technique, and further decrease the probability of out-of-synchronization occurrence.

DESCRIPTION OF THE PREFERRED EMBODIMENT

Hereinafter, a preferred embodiment of the present invention will be explained with reference to the accompanying drawings.

Figure 1:
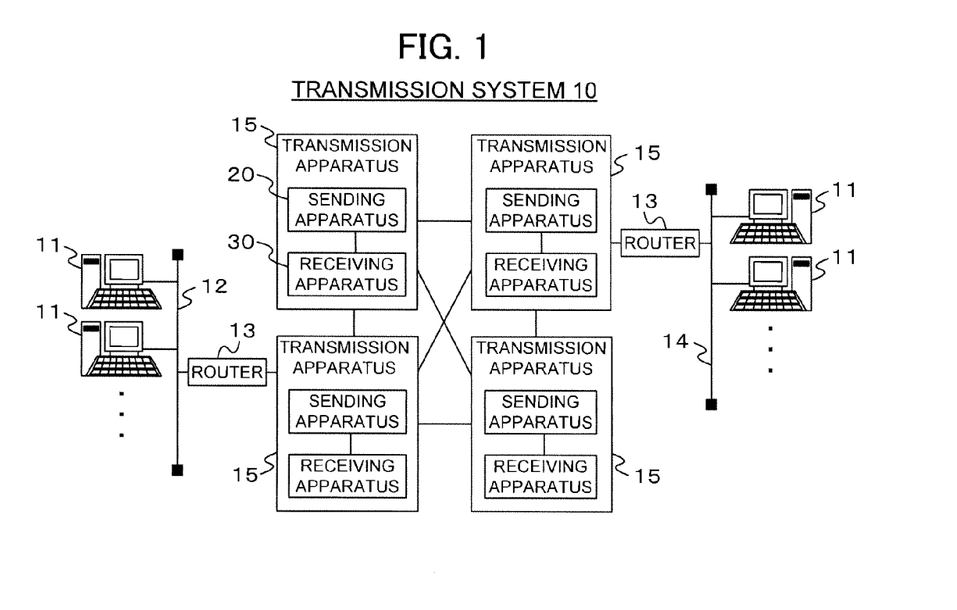
FIG. 1 illustrates a system configuration showing the configuration of a transmission system relating to one embodiment of the present invention.

FIG. 1 illustrates a system configuration showing the configuration of the transmission system 10 relating to one embodiment of the present invention. In the present embodiment, the transmission system 10 is an OTN (Optical Transport Network) provided with multiple transmission apparatuses 15. Each of the transmission apparatuses 15 incorporates the sending apparatus 20 and the receiving apparatus 30.

When the sending apparatus 20 receives data being a transmission target from a terminal device 11 via a router 13, or receives data being a transmission target from the receiving apparatus 30 held by the transmission apparatus 15 in which the sending apparatus itself is incorporated, the sending apparatus manipulates the received data into a format of a predetermined transmission frame, and sends the manipulated data to other transmission 15. The transmission frame includes a synchronization signal.

The receiving apparatus 30 searches for the synchronization signal in the transmission frame sent from a second transmission apparatus 15, thereby establishing frame synchronization. Then, the receiving apparatus 30 extracts the data being the transmission target from the transmission frame sent from other transmission apparatus 15, and sends the extracted data to the sending apparatus 20 held by the transmission apparatus 15 in which the receiving apparatus 30 itself is incorporated, or to the terminal device 11 via the external router 13.

Figure 2:
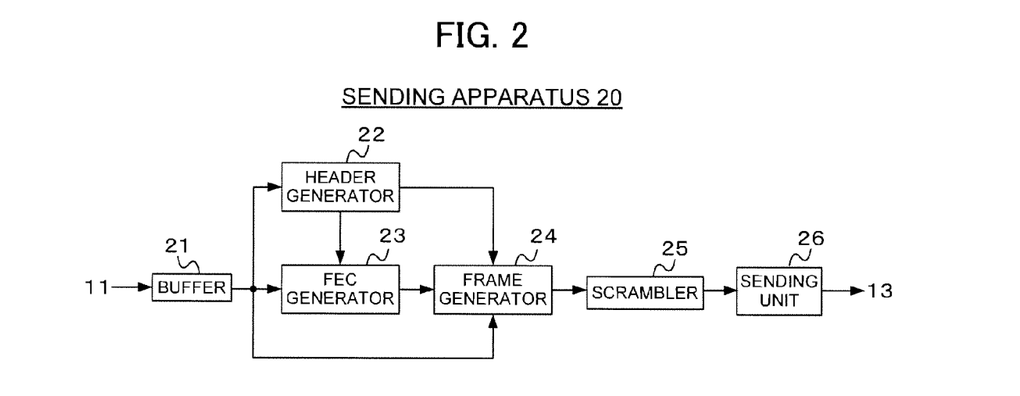
FIG. 2 is a block diagram showing one example of a functional configuration of a sending apparatus.

FIG. 2 is a block diagram showing one example of a functional configuration of the sending apparatus 20. The sending apparatus 20 incorporates a buffer 21, a header generator 22, an FEC generator 23, a frame generator 24, a scrambler 25, and a sending unit 26.

The buffer 21 receives and holds data being the transmission target from the terminal device 11 via the router 13, or from the receiving apparatus 30 included in the transmission apparatus 15 in which the sending apparatus itself is incorporated, and when a timing for sending a frame comes, the transmission target data being held is transmitted to the header generator 22, the FEC generator 23, and the frame generator 24.

The header generator 22 generates a header including a first synchronization signal and a second synchronization signal, and sends the generated header to the FEC generator 23 and the frame generator 24. The header that the header generator 22 generates has a data structure as shown in FIG. 3, for instance.

Figure 3:
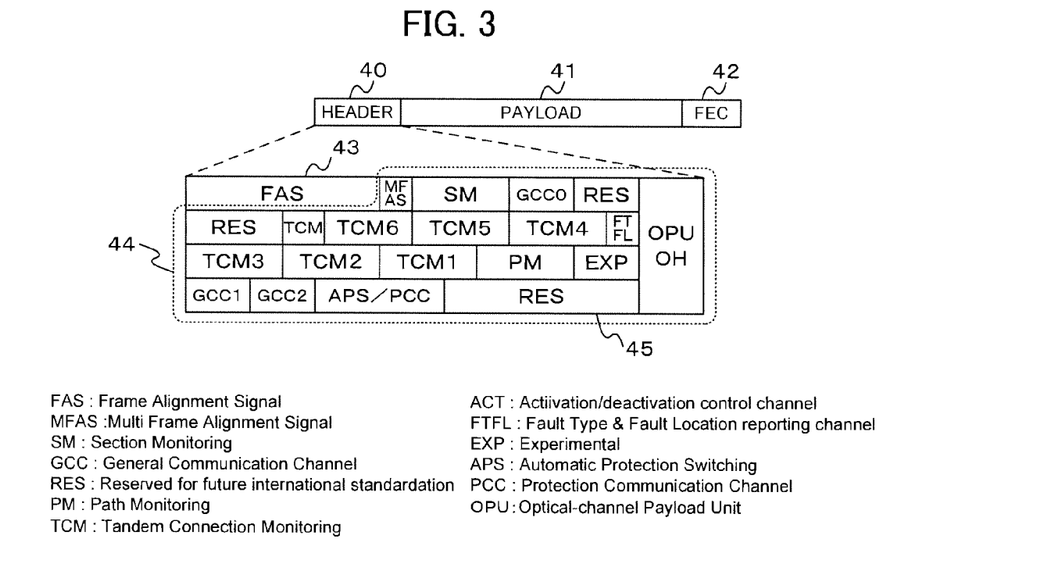
FIG. 3 is a conceptual diagram showing an example of a structure of a transmission frame.

FIG. 3 illustrates a data structure of a transmission frame. The transmission frame includes a header 40, a payload 41, and FEC data 42. FAS (Frame Alignment Signal) stored in the area 43 within the header 40 is the first synchronization signal in the present embodiment. The second synchronization signal is stored in RES of the area 45, for instance, in the present embodiment. The first synchronization signal and the second synchronization signal may be the same signals, or different signals.

The FEC generator 23 generates FEC data based on a portion of the header generated by the header generator 22, and the data as the transmission target received from the buffer 21, and sends the FEC data being generated to the frame generator 24. The portion of the header indicates the data included in the area 44 as shown in FIG. 3, for instance. In other words, the first synchronization signal within the area 43 is excluded from the FEC target.

The frame generator 24 assumes as a payload, the data being the transmission target, which is sent from the buffer 21, generates a transmission frame including this payload, the header generated by the header generator 22, and the FEC data generated by the FEC generator 23, and transmits the transmission frame being generated to the scrambler 25.

The scrambler 25 scrambles a portion other than FAS in the header, the payload, and the FEC data in the transmission frame generated by the frame generator 24, and transmits the transmission frame being scrambled to the sending unit 26. The sending unit 26 sends the transmission frame being received to a second transmission apparatus 15.

Figure 4:
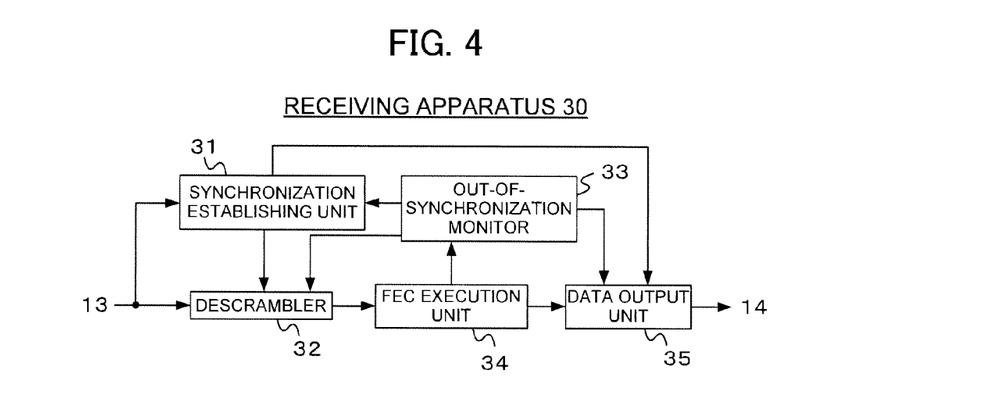
FIG. 4 is a block diagram showing one example of a functional configuration of a receiving apparatus.

FIG. 4 is a block diagram showing one example of a functional configuration of the receiving apparatus 30. The receiving apparatus 30 incorporates a synchronization establishing unit 31, a descrambler 32, an out-of-synchronization monitor 33, an FEC execution unit 34, and a data output unit 35.

The synchronization establishing unit 31 searches for the first synchronization signal stored in the header of the transmission frame. Searching for the synchronization signal is implemented as the following; the synchronization establishing unit 31 captures into a buffer, data corresponding to one frame sent from a second transmission apparatus 15, for instance, and checks whether any position in the data matches the first synchronization signal, shifting the check position in the data sequentially bit by bit, as to the captured data corresponding to one frame.

When the first synchronization signal is successively detected as to a predetermined number of frames in series, the synchronization establishing unit 31 determines that frame synchronization has been established. Then, the synchronization establishing unit 31 notifies the descrambler 32, the out-of-synchronization monitor 33, and the data output unit 35, that the receiving apparatus 30 has shifted to the synchronous state, and simultaneously notifies the descrambler 32 of the timing for starting the transmission frame.

On the other hand, in receipt of a notification from the out-of-synchronization monitor 33 that the receiving apparatus 30 has shifted to out-of-synchronization state, the synchronization establishing unit 31 restarts searching for the first synchronization signal that is stored in the header of the transmission frame.

In receipt of the notification from the synchronization establishing unit 31 that the receiving apparatus 30 has shifted to the synchronous state, together with the timing for starting the transmission frame, the descrambler 32 resets scrambling having been applied to the transmission frame (performs descrambling) from the start timing being notified, and transmits the transmission frame being reset to the state before scrambling, to the FEC execution unit 34. On the other hand, in receipt of the notification from the out-of-synchronization monitor 33 that the receiving apparatus 30 has shifted to the out-of-synchronization (HUNT) state, the descrambler 32 stops the processing for resetting the scrambling that is applied to the transmission frame.

The FEC execution unit 34 uses the FEC data within the transmission frame received from the descrambler 32, so as to execute error correction processing on the portion other than FAS in the header and on the payload. Then, the FEC execution unit 34 transmits to the data output unit 35, the transmission frame after subjected to the error correction processing, simultaneously extracts data at the position where the second synchronization signal is stored, from the header of the transmission frame, and transmits the extracted data to the out-of-synchronization monitor 33.

In receipt of the notification from the synchronization establishing unit 31 that the receiving apparatus 30 comes into the synchronous state, the data output unit 35 extracts the payload from the transmission frame received from the FEC execution unit 34, and sends the extracted payload to the sending apparatus 20 held by the transmission apparatus 15 where the receiving apparatus itself is incorporated, or to the terminal device 11 via the external router 13. On the other hand, in receipt of the notification from the out-of-synchronization monitor 33 that the receiving apparatus 30 comes into the out-of-synchronization state, the data output unit 35 stops extracting and sending the payload.

The out-of-synchronization monitor 33 determines whether or not the data sequentially transmitted from the FEC execution unit 34 at each frame timing point is the second synchronization signal. The out-of-synchronization monitor 33 determines that the state becomes out of frame synchronization, in the case where the second synchronization signal successively fails to be detected as to a predetermined number of frames in series. When it is determined as being out of frame synchronization, the out-of-synchronization monitor 33 notifies the synchronization establishing unit 31, the descrambler 32, and the data output unit 35, that the receiving apparatus 30 has shifted to the out-of-synchronization state.

Figure 5:
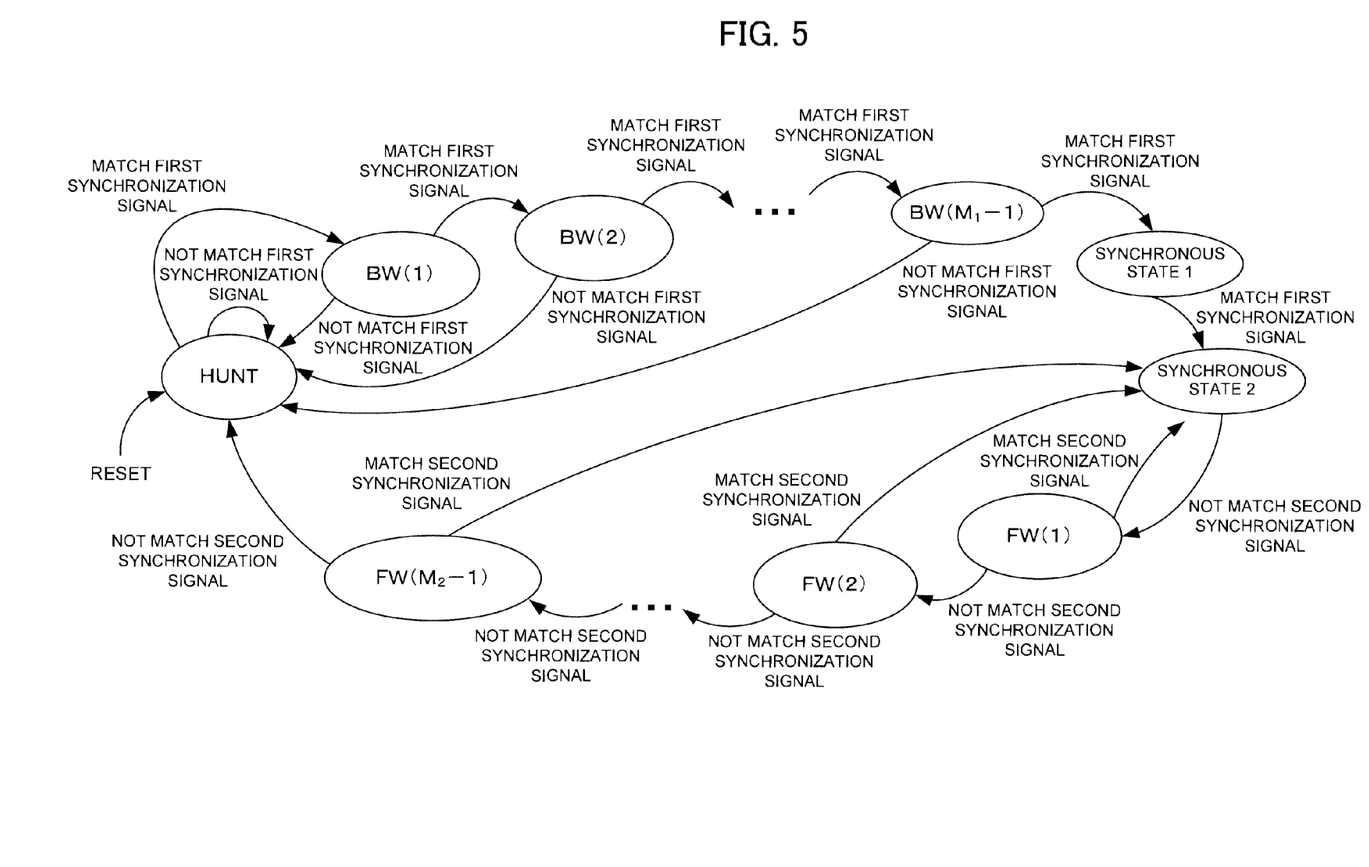
FIG. 5 is a state transition diagram for explaining a state transition of the receiving apparatus.

Here, with reference to FIG. 5, an explanation will be made regarding a state transition of the receiving apparatus 30 in the present embodiment. After resetting, the state of the receiving apparatus 30 shifts to the HUNT state, and in the HUNT state, the synchronization establishing unit 31 searches for the first synchronization signal in the header of the transmission frame.

When data matching the first synchronization signal is found successfully in the data received during the HUNT state, the state of the receiving apparatus 30 shifts to BW(1) state, and in this state, the synchronization establishing unit 31 determines whether or not data which matches the first synchronization signal is successfully received at the timing when the next frame is sent. If data matching the first synchronization signal fails to be received at the next frame timing in the state of BW(1), the state of the receiving apparatus 30 returns to the HUNT state.

On the other hand, when data matching the first synchronization signal is successfully received at the next frame timing in the state of BW(1), the state of the receiving apparatus 30 shifts to BW(2) state. As thus described, when data matching the first synchronization signal is received sequentially as to the transmission frames in series, the number of which is $M_1$, the state of the receiving apparatus 30 shifts to the synchronous state. In the present embodiment, $M_1$ is 2, for instance, and when the first synchronization signal is received sequentially two times, the state of the receiving apparatus 30 shifts to the synchronous state.

When the state of the receiving apparatus 30 shifts to the synchronous state, the out-of-synchronization monitor 33 refers to the area 45 of each of the transmission frames after the error correction is applied, and determines whether or not data matching the second synchronization signal is successfully received.

When data matching the second synchronization signal fails to be received in the synchronous state, the state of the receiving apparatus 30 shifts to the state of FW(1), and during this state, the out-of-synchronization monitor 33 makes a judgment whether or not data matching the second synchronization signal is successfully received in the area 45 within the next frame after the error correction has been applied. When data matching the second synchronization signal is successfully received at the next frame timing after the error correction is applied in the state of FW(1), the state of the receiving apparatus 30 returns to the synchronous state.

On the other hand, when data matching the second synchronization signal fails to be received at the next frame timing after the error correction is applied in the FW(1) state, the state of the receiving apparatus 30 shifts to the state of FW(2). As thus described, when data matching the second synchronization signal fails to be detected sequentially in the area 45 within each of the $M_2$ transmission frames in series after the error correction is applied, the state of the receiving apparatus 30 shifts to the out-of-synchronization (HUNT) state. In the present embodiment, $M_2$ is 5, for instance, and failing to receive the second synchronization signal sequentially five times shifts the state of the receiving apparatus 30 to out-of-synchronization state.

Figure 6:
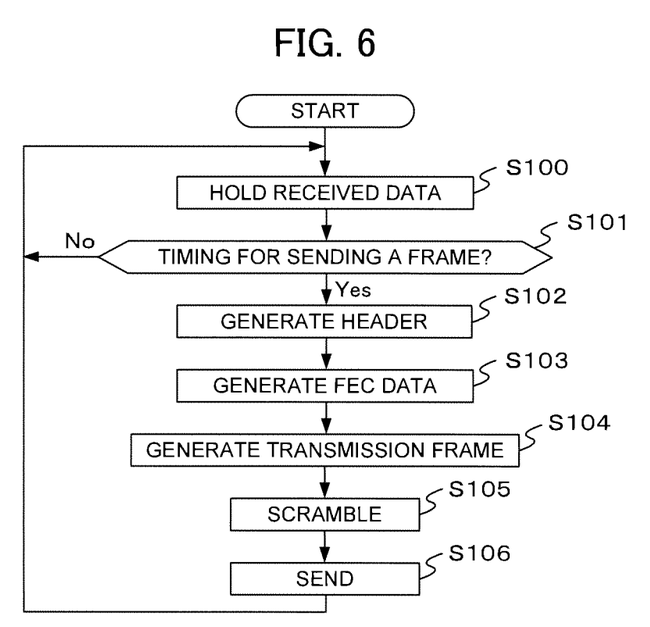
FIG. 6 is a flowchart showing one example of operation of the sending apparatus.

FIG. 6 is a flowchart showing one example of operation of the sending apparatus 20. By way of example, at a predetermined timing such as application of power, the sending apparatus 20 starts the operation as shown in the flowchart.

Firstly, the buffer 21 holds data received from the terminal device 11 via the router 13, or from the receiving apparatus 30 in the transmission apparatus 15 where the sending apparatus itself is incorporated (S100), and determines whether it is a timing for sending a frame (S101). If it is not the timing for sending the frame (S101: No), the buffer 21 again executes the processing as shown in the step of S100.

When the timing for sending the frame comes (S101: Yes), the buffer 21 transmits the data being held to the header generator 22, the FEC generator 23, and the frame generator 24.

Next, the header generator 22 generates a header including a first synchronization signal and a second synchronization signal based on the data being the transmission target received from the buffer 21, and transmits the header being generated to the FEC generator 23 and the frame generator 24 (S102).

Next, the FEC generator 23 generates FEC data based on a portion of the header generated by the header generator 22 and the data being the transmission target received from the buffer 21, and transmits the FEC data being generated to the frame generator 24 (S103).

Next, the frame generator 24 uses as a payload, the data being the transmission target that is transmitted from the buffer 21, generates a transmission frame including the payload, the header generated by the header generator 22, and the FEC data generated by the FEC generator 23, and transmits the transmission frame being generated to the scrambler 25 (S104).

Next, the scrambler 25 scrambles the portion other than the FAS in the header, the payload, and the FEC data in the transmission frame generated by the frame generator 24, and transmits the scrambled transmission frame to the sending unit 26 (S105).

Next, the sending unit 26 sends the transmission frame received from the scrambler 25 to other transmission apparatus 15 (S106), and the buffer 21 again executes the processing as shown in the step of S100.

Figure 7:
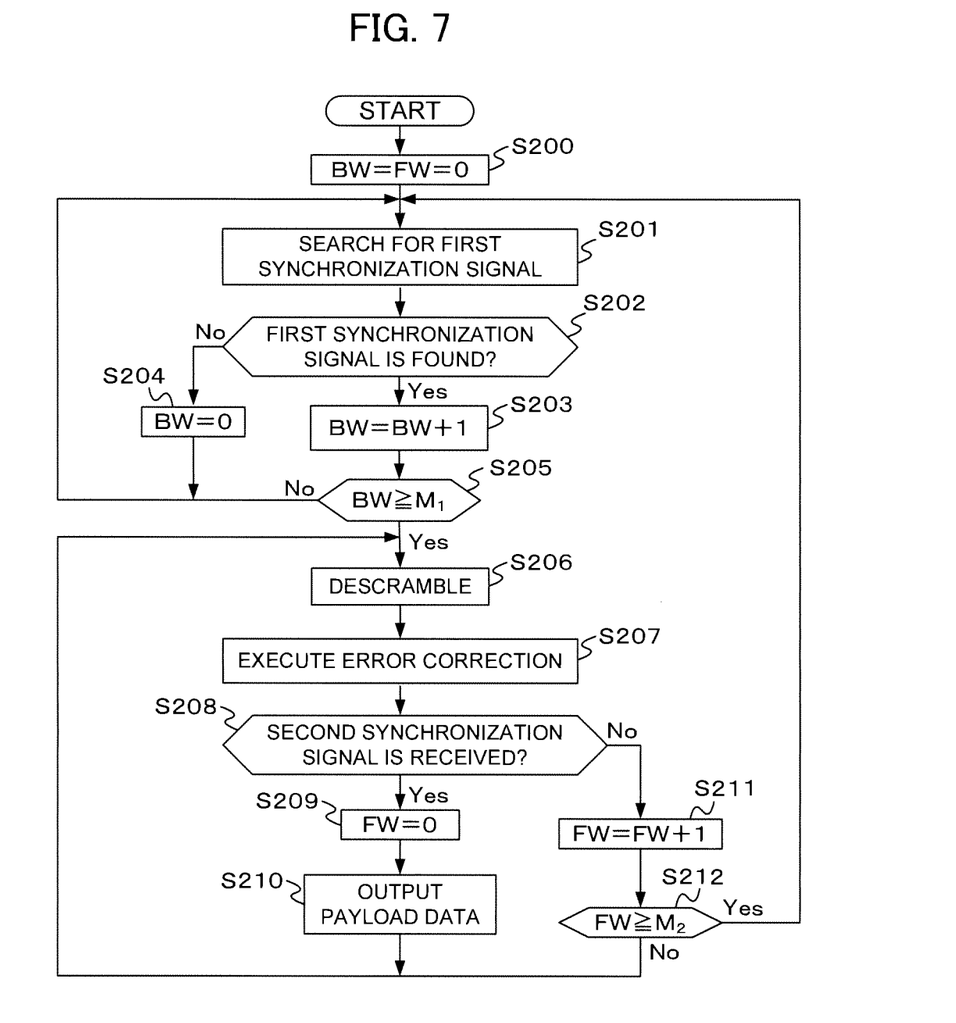
FIG. 7 is a flowchart showing one example of operation of the receiving apparatus.

FIG. 7 is a flowchart showing an example of operation of the receiving apparatus 30. By way of example, the receiving apparatus 30 starts the operation as shown in the flowchart at a predetermined timing such as application of power.

Firstly, the synchronization establishing unit 31 initializes a value of variable BW to zero, and the out-of-synchronization monitor 33 initializes a value of variable FW to zero (S200). The synchronization establishing unit 31 receives data corresponding to one frame, sent from other transmission apparatus 15, and checks whether any position in the data matches the first synchronization signal, shifting the check position in the data sequentially bit by bit, as to the received data corresponding to one frame (S201).

When the data matching the first synchronization signal fails to be found within the data corresponding to one frame being received (S202: No), the synchronization establishing unit 31 initializes the value of the variable BW to zero (S204), and again executes the processing as shown in the step S201.

On the other hand, when data matching the first synchronization signal is successfully found (S202: Yes), the synchronization establishing unit 31 increments the value of the variable BW by one (S203), and makes a judgment whether or not the value of the variable BW becomes $M_1$ or higher (S205). In the present embodiment, $M_1$ is 2, for instance. When the value of the variable BW is smaller than $M_1$ (S205: No), the synchronization establishing unit 31 again executes the processing as shown in the step S201.

When the value of the variable BW is equal to or higher than $M_1$ (S205: Yes), the synchronization establishing unit 31 determines that the frame synchronization has been established, notifies the descrambler 32, the out-of-synchronization monitor 33, and the data output unit 35, that the receiving apparatus 30 has shifted the synchronous state, and simultaneously, notifies the descrambler 32 of a timing for starting the transmission frame.

Next, the descrambler 32 resets scrambling applied to the transmission frame (performs de s c ramb1 ing), from the start timing notified from the synchronization establishing unit 31, and transmits to the FEC execution unit 34, the transmission frame that is returned to the state before scrambling is applied (S206).

Next, the FEC execution unit 34 uses the FEC data within the transmission frame received from the descrambler 32, so as to execute error correction processing on the portion other than the FAS in the header and on the payload (S207). Then, the FEC execution unit 34 transmits the transmission frame after the error correction processing is performed thereon to the data output unit 35, simultaneously extracts data at the position where the second synchronization signal is stored, from the header of the transmission frame, and then transmits the extracted data to the out-of-synchronization monitor 33.

Next, the out-of-synchronization monitor 33 makes a judgment whether or not the data in the area 45 transmitted from the FEC execution unit 34 matches the second synchronization signal, thereby determining whether or not the second synchronization signal is successfully received at the frame timing (S208). When the second synchronization signal is successfully received (S208: Yes), the out-of-synchronization monitor 33 initializes the value of the variable FW to zero (S209).

Next, the data output unit 35 extracts the payload from the transmission frame received from the FEC execution unit 34, and sends the extracted payload to the sending apparatus 20 held by the transmission apparatus 15 in which the receiving apparatus itself is incorporated, or to the terminal device 11 via an external router 13 (S210), and the descrambler 32 again executes the processing as shown in the step of S206.

On the other hand, when the second synchronization signal fails to be received (S208: No), the out-of-synchronization monitor 33 increments the value of the variable FW by one (S211), and makes a judgment whether or not the value of the variable FW becomes equal to or higher than $M_2$ (S212). In the present embodiment, $M_2$ is 5, for instance. When the value of the variable FW is lower than $M_2$ (S212: No), the descrambler 32 again executes the processing as shown in the step of S206.

On the other hand, when the value of the variable FW becomes equal to or higher than $M_2$ (S212: Yes), the out-of-synchronization monitor 33 determines that the state becomes out of frame synchronization. Then, the out-of-synchronization monitor 33 notifies the synchronization establishing unit 31, the descrambler 32, and the data output unit 35, that the receiving Apparatus 30 has shifted to the out-of-synchronization state, and the synchronization establishing unit 31 again executes the processing as shown in the step S201.

Figure 8:
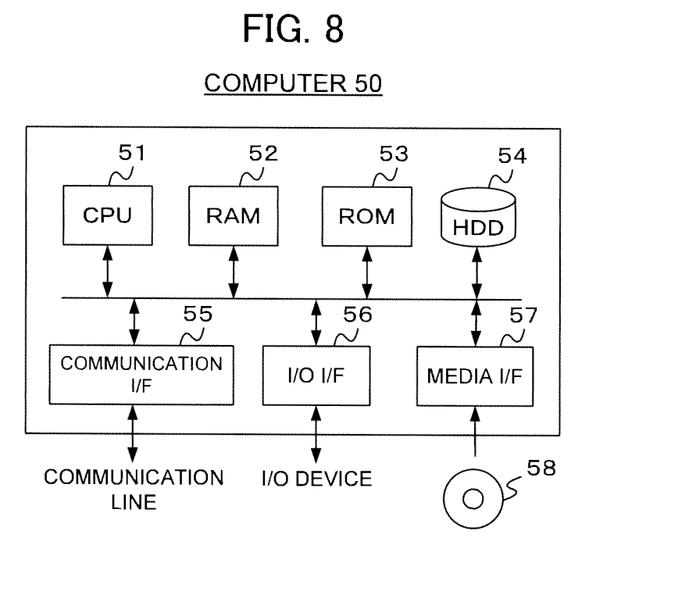
FIG. 8 illustrates a hardware configuration showing one example of a computer for implementing the function of the sending apparatus or the receiving apparatus.

FIG. 8 illustrates a hardware configuration showing one example of the computer 50 that implements function of the sending apparatus 20 or the receiving apparatus 30. The computer 50 is provided with a CPU (Central Processing Unit) 51, RAM (Random Access Memory) 52, ROM (Read Only Memory) 53, HDD (Hard Disk Drive) 54, communications interface (I/F) 55, I/O interface (I/F) 56, and media interface (I/F) 57.

The CPU 51 operates based on programs stored in the ROM 53 or the HDD 54, so as to exercise control over each unit. The ROM 53 stores various programs, such as a boot program executed by the CPU 51 upon starting up the computer 50 and a program depending on the hardware of the computer 50.

The HDD 54 stores programs, data, and the like, such as programs executed by the CPU 51 and data used by those programs. The communication interface 55 receives data from other device via a communication line and transmits the data to the CPU 51, and also sends the data received from the CPU 51 to other device via the communication line.

The CPU 51 controls I/O devices such as a display device and a keyboard, via the I/O interface 56. The CPU 51 acquires data from the I/O devices via the I/O interface 56. In addition, the CPU 51 outputs the data being generated to the I/O devices via the I/O interface 56.

The media interface 57 reads programs or data stored in a recording medium 58, and provides the programs and data to the CPU 51 via the RAM 52. The CPU 51 loads the programs on the RAM 52 from the recording medium 58 via the media interface 57, and executes the loaded programs. The recording medium 58 may be, for example, an optical recording medium such as a DVD (Digital Versatile Disk) and a PD (Phase change rewritable Disk), a magneto-optical medium such as an MO (Magneto-Optical disk), a tape media, a magnetic recording media, a semiconductor memory, or the like.

When the computer 50 functions as the sending apparatus 20, the CPU 51 of the computer 50 executes the programs loaded on the RAM 52, thereby implementing each of the functions of the buffer 21, the header generator 22, the FEC generator 23, the frame generator 24, the scrambler 25, and the sending unit 26.

When the computer 50 functions as the receiving apparatus 30, the CPU 51 of the computer 50 executes the programs loaded on the RAM 52, thereby implementing each of the functions of the synchronization establishing unit 31, the descrambler 32, the out-of-synchronization monitor 33, the FEC execution unit 34, and the data output unit 35.

The CPU 51 of the computer 50 reads those programs from the recording medium 58 and executes them, but, those programs may be acquired from other device via a communication medium, as an alternative example. The communication medium may be a communication line, or a digital signal or a carrier wave which propagates the communication line.

As described above, one preferred embodiment of the present invention has been explained.

As is clear from the explanation above, according to the transmission system 10 of the present embodiment, it is possible to establish synchronization with a degree of precision and at a speed, being comparable levels as a conventional technique, and further decrease the probability of out-of-synchronization occurrence.

It is to be noted here that the present invention is not limited to the embodiment as described above, and it may be variously modified within the scope of the invention.

Figure 9:
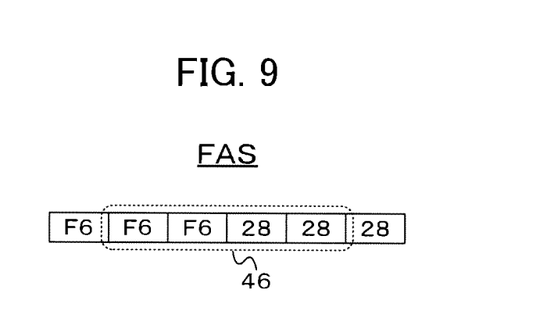
FIG. 9 is a conceptual diagram showing one example of a detailed structure of FAS (Frame Alignment Signal).

By way of example, as shown in FIG. 3, the header generator 22 stores the first synchronization signal in the area 43 within the header, and stores the second synchronization signal in the area 45, but this is not the only example of the invention. According to the current OTN standard, FAS in the header is data of six bytes as shown in FIG. 9, for instance, and a hexadecimal number "F6" is stored in the first three bytes, and a hexadecimal number "28" is stored in the latter three bytes.

However, the data actually used for establishing and monitoring synchronization only corresponds to four bytes included in the area 46. Therefore, the data from the second byte to the fifth byte of FAS is assumed as the synchronization signal, and signals for performing error correction on the synchronization signal may be stored in the first one byte and in the last sixth byte.

On this occasion, the synchronization establishing unit 31 in the HUNT state uses the data in the first byte and the data in the sixth byte, as to the data of six bytes at any position within the data corresponding to one frame received from a second transmission apparatus 15, so as to perform error correction on the data from the second byte to the fifth byte, and thereafter makes a judgment whether or not the data from the second byte to the fifth byte corresponds to the synchronization signal. With this configuration, it is possible to correct an error of the synchronization signal within the FAS, thereby eliminating the necessity for storing the second synchronization signal in the area 45 of the header.

When a method of error correction executed by the FEC generator 23 is to add an error correction signal generated from original data by an arithmetic operation, without changing the original data being the error correction target, the FEC generator 23 may generate the FEC data using the entire header including FAS and the payload as a target for the FEC. With this method of error correction as described above, the original data is stored as it is in the transmission frame (in this case here, it should be noted that it is necessary for the scrambler 25 not to scramble the FAS data, similar to the embodiment above).

On the receiving side, by searching for the FAS not scrambled, it is possible to establish synchronization, and after the frame synchronization is established, monitoring whether or not the synchronization is maintained can be performed, by using the FAS in the transmission frame on which descrambling and error correction have been performed. Also for this case, it becomes unnecessary to store the second synchronization signal in the area 45 of the header.

What is claimed is:

1. A receiving apparatus for receiving a transmission frame that is sent via a network,
   the transmission frame including header information, a payload, and FEC (Forward Error Correction) data,
   the header information including a first synchronization signal and a second synchronization signal, and the FEC data being data for correcting an error in a portion other than the first synchronization signal in the header information and in the payload, the receiving apparatus comprising, a synchronization establishing unit configured to establish frame synchronization by detecting the first synchronization signal in the header information of the transmission frame, an FEC execution unit configured to execute error correction in the header information and in the payload, by using the FEC data within the transmission frame, after the synchronization establishing unit has established the frame synchronization, an out-of-synchronization monitor configured to make a judgment whether or not the frame synchronization is maintained, by determining whether or not the second synchronization signal included in the header information having been subjected to the error correction by the FEC execution unit matches a signal pattern being predetermined, and a data output unit configured to extract the payload within the transmission frame when the out-of-synchronization monitor determines that the frame synchronization is maintained, and output the payload to an external device.

2. The receiving apparatus according to claim 1, wherein, in the transmission frame, scrambling is applied to the portion other than the first synchronization signal in the header information, the payload, and the FEC data, the receiving apparatus further comprises a descrambler configured to cancel the scrambling applied to the transmission frame, after the synchronization establishing unit establishes frame synchronization, and the FEC execution unit is configured to execute error correction on the header information and the payload included in the transmission frame as to which the descrambler has canceled the scrambling.

3. The receiving apparatus according to claim 1, wherein, the second synchronization signal is assigned to a reserved area within the header information, in a predetermined format of the header information.

4. A transmission system comprising, a sending apparatus configured to send a transmission frame via a network, and a receiving apparatus configured to receive the transmission frame that is sent via the network, wherein, the sending apparatus comprises, a header generator configured to generate header information including a first synchronization signal, a second synchronization signal, and information relating to user data as a transmission target, being inputted from an external device, an FEC (Forward Error Correction) generator configured to generate FEC data for correcting an error in a portion other than the first synchronization signal in the header information generated by the header generator and in the user data, a frame generator configured to use the user data as a payload to generate a transmission frame including the header information, the payload, and the FEC data, and a sending unit configured to send, via the network, the transmission frame generated by the frame generator, and the receiving apparatus comprises, a synchronization establishing unit configured to establish frame synchronization by detecting the first synchronization signal within the header information of the transmission frame, an FEC execution unit configured to execute error correction in the header information and in the payload, by using the FEC data within the transmission frame, after the synchronization establishing unit has established the frame synchronization, an out-of-synchronization monitor configured to make a judgment whether or not the frame synchronization is maintained, by determining whether or not the second synchronization signal included in the header information having been subjected to the error correction by the FEC execution unit matches a signal pattern being predetermined, and a data output unit configured to extract the payload within the transmission frame when the out-of-synchronization monitor determines that the frame synchronization is maintained, and output the payload to an external device.

5. The transmission system according to claim 4, wherein, the sending apparatus further comprises a scrambler configured to provide scrambling to a portion other than the first synchronization signal in the header information, the payload, and the FEC data, in the transmission frame generated by the frame generator, and the sending unit is configured to send, via the network, the transmission frame to which scrambling is provided by the scrambler.

6. The transmission system according to claim 4, wherein, the header generator is configured to assign the second synchronization signal to a reserved area within the header information, in a predetermined format of the header information.

7. The transmission system according to claim 4, wherein, in the transmission frame, scrambling is applied to the portion other than the first synchronization signal in the header information, the payload, and the FEC data, the receiving apparatus further comprises a descrambler configured to cancel the scrambling applied to the transmission frame, after the synchronization establishing unit establishes frame synchronization, and the FEC execution unit is configured to execute error correction on the header information and the payload included in the transmission frame as to which the descrambler has canceled the scrambling.

8. The transmission system according to claim 4, wherein, the second synchronization signal is assigned in a reserved area within the header information, in a predetermined format of the header information.

* * * * *